United States Patent [19]

Higuchi et al.

[11] Patent Number: 5,727,134
[45] Date of Patent: Mar. 10, 1998

[54] OUTPUT APPARATUS AND METHOD FOR DISTINGUISHABLY OUTPUTTING INFORMATION FROM PLURAL INFORMATION PROCESSING APPARATUSES

[75] Inventors: Yuichi Higuchi, Kawasaki; Nobuhiko Sato, Yokohama, both of Japan

[73] Assignee: Canon Kabushiki Kaisha, Japan

[21] Appl. No.: 386,341

[22] Filed: Feb. 10, 1995

Related U.S. Application Data

[63] Continuation of Ser. No. 14,685, Feb. 8, 1993, abandoned.

[30] Foreign Application Priority Data

Feb. 10, 1992 [JP] Japan .................. 4-023464
Mar. 30, 1992 [JP] Japan .................. 4-074597

[51] Int. Cl.$^6$ .............................. G06F 15/00; H04N 1/40
[52] U.S. Cl. ............................... 395/101; 395/114
[58] Field of Search .......................... 395/101, 114

[56] References Cited

U.S. PATENT DOCUMENTS

| | | | |
|---|---|---|---|
| 4,443,850 | 4/1984 | Harris | 395/843 |
| 4,547,880 | 10/1985 | De Vita et al. | 370/91 |
| 4,829,468 | 5/1989 | Nonaka et al. | 395/117 |
| 4,864,417 | 9/1989 | Watanabe et al. | 358/296 |
| 4,965,771 | 10/1990 | Morikawa et al. | |
| 5,018,079 | 5/1991 | Shukunami et al. | 364/519 |
| 5,047,957 | 9/1991 | Ikenoue | 364/519 |
| 5,113,355 | 5/1992 | Nomura | 395/110 |
| 5,146,544 | 9/1992 | Altham et al. | 395/114 |
| 5,163,131 | 11/1992 | Row et al. | |
| 5,355,231 | 10/1994 | Murata | 358/443 |

FOREIGN PATENT DOCUMENTS

| | | |
|---|---|---|
| 0450663 | 10/1991 | European Pat. Off. . |
| 0468762 | 1/1992 | European Pat. Off. . |
| 9012359 | 10/1990 | WIPO . |

*Primary Examiner*—Krisna Lim
*Attorney, Agent, or Firm*—Fitzpatrick, Cella, Harper & Scinto

[57] ABSTRACT

An output apparatus processes data input selectively from a plurality of host computers and outputs a data processing state. The output apparatus includes an input structure that inputs data selectively from the plurality of host computers, a discriminating device that discriminates from which one of the plurality of host computers the input data is supplied, and an informing device for informing an operator of the output apparatus of the data processing state of the output apparatus in response to a discrimination by the discriminating device. An output method performs the operations of the output apparatus, and can be performed by using a memory medium that stores a program used in a programmable output apparatus. The output apparatus may use a host interface, or a plurality of host interfaces, for the input structure.

20 Claims, 9 Drawing Sheets

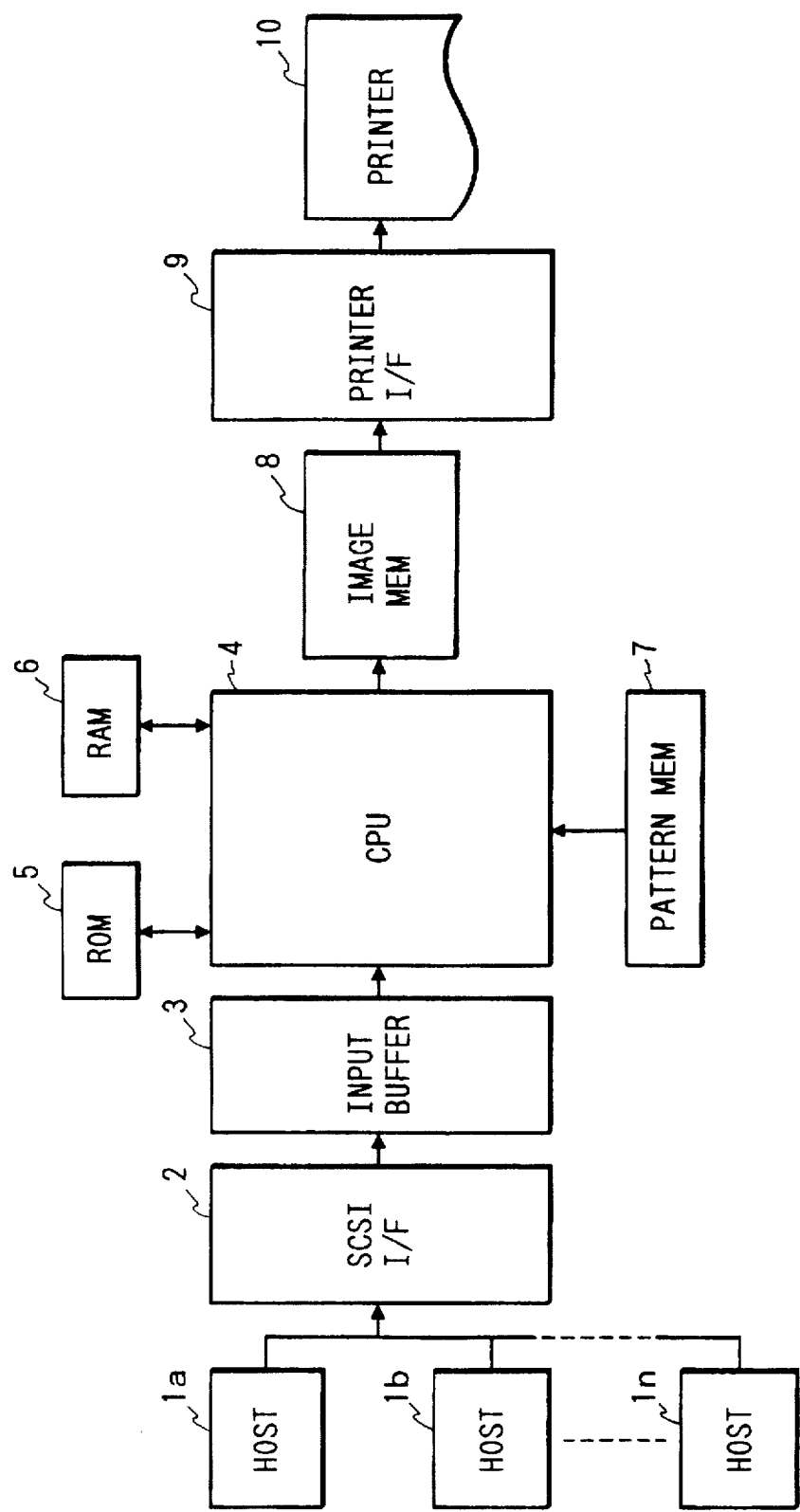

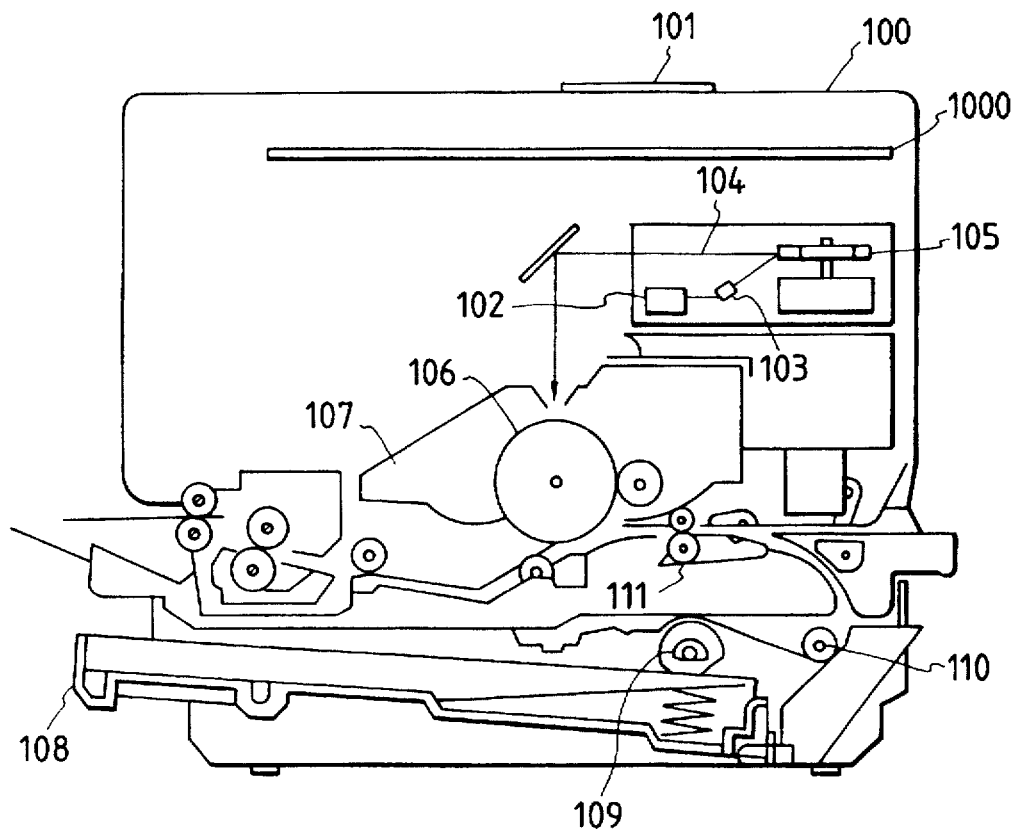

OUTPUT APPARATUS AND METHOD FOR DISTINGUISHABLY OUTPUTTING INFORMATION FROM PLURAL INFORMATION PROCESSING APPARATUSES

This application is a continuation of application Ser. No. 08/014,685 filed Feb. 8, 1993 now abandoned.

BACKGROUND OF THE INVENTION

1. Field of the Invention

The present invention relates to an output method and unit, or more particularly, to an output method and unit enabling connection with a plurality of output data generation sources.

2. Related Background Art

A printer having multiple host interfaces has been introduced in the past. The respective interfaces are connected to electronic equipment (for example, host computers) for generating print data, whereby the operators of the electronic equipment can execute printing at their places.

However, while receiving and printing print data from, for example, a host computer A, this kind of printer does not receive or print data sent from other host computers B, C, etc.

Therefore, other operators except the one at the host computer A which is currently engaged in communication cannot print their data until the other's printing currently in progress is completed. This is discouraging in terms of a working environment.

A printer shared by multiple host computer systems (hereafter, hosts) outputs print data sent from the hosts as they are without any control.

In the aforesaid prior art, a host intending to transmit print data must issue an emulation switch instruction so that a printer to which the host is connected will be emulated to enable communication with the host. Alternatively, a user of the printer must select an emulator by performing a specified operation on the printer. This results in complex control of communication between a host and a printer or complex operations of a printer.

When a printer is shared by multiple hosts, it is hard to differentiate which printed forms are output by which hosts. The printed forms must be sorted by studying the output contents. From the viewpoint of efficiency in sorting, improvements have been awaited.

SUMMARY OF THE INVENTION

An object of the present invention is to provide an output unit capable of being connected to a plurality of data generation sources; wherein print data can be input substantially simultaneously from the respective data generation sources and printing is performed by data generation sources, whereby a working environment improves; and its control method.

Another object of the present invention is to provide an output unit that includes a plurality of interfaces for connecting a plurality of data generation sources, and that determines by the interfaces whether a reception request is issued therefor. The apparatus receives output data via interfaces for which a reception request has been issued and stores the received output data in a one-to-one correspondence with the respected interfaces. The apparatus also control output processing so that the output of second received data will start after the output of first received data has been completed.

Another object of the present invention is to provide an output method including a determining process that determines by interfaces connected to a plurality of data generation sources whether a reception request is issued therefor. An input process inputs print data via interfaces for which a reception request has been issued and stores the input print data in a one-to-one correspondence with respective interfaces. A control process controls the printing so that the printing of received data, which is second data stored in the input process, will start after the completion of printing of other received data, which is the first data stored in the input process.

Another object of the present invention is to provide an output unit capable of confirming from which data generation source output data is being received.

Another object of the present invention is to provide an output unit that includes a plurality of interfaces for connecting a plurality of data generation sources and that determines by interface whether a reception request is issued therefor. The unit receives output data via interfaces for which a reception request has been issued and stores the received output data in one-to-one correspondence with the respective interfaces, and controls output processing so that output of second received data will start after the completion of output of first received data which has been stored. The unit also notifies externally (to an operator) the states of the interfaces for which the determining means determines a reception request has issued, or the states of interfaces concerned with the input of data.

Yet another object of the present invention is to provide an output method in which data is received via interfaces from a plurality of interfaces for which a reception request is issued, and the received data is stored in one-to-one correspondence with the respective interfaces. The unit controls output processing so that output of second received data will start after completion of the output of first received data which has been stored.

Still another object of the present invention is to provide an output unit capable of being connected to a plurality of data generation sources, wherein output data is received from the data generation sources substantially simultaneously, and output processing is executed by data generation sources to improve a working environment, and its control method.

Still another object of the present invention is to provide an output method in which inputs of output data of a plurality of hosts are differentiated from one another in order to simplify sorting of outputs by hosts, and an output unit in which the output method is implemented.

Still another object of the present invention is to provide an output method comprising a discrimination process in which when output data is received from a plurality of hosts and the output data is supplied, a host intending to transmit output data is discriminated from the plurality of hosts, a preparation process in which preparations are made to receive output data from the host intending to transmit output data in accordance with the result of discrimination in the discrimination process, a comparison process in which it is checked if a host which transmitted output data during the previous output is identical to the host discriminated in the discrimination process, and a control process in which output processing is controlled so that the output data will be offset in accordance with the result of comparison made in the comparison process, and an output unit in which the output method is implemented.

Still another object of the present invention is to provide an output unit that is connected to a plurality of host, receives output data from the plurality of hosts, and supplies output data, comprising a discriminating means that discriminates a host intending to transmit output data from the plurality of hosts, a preparing means that makes preparations to receive output data from a host intending to transmit output data in accordance with the result of discrimination made by the discriminating means, a comparing means that checks if a host which transmitted output data during the previous output is identical to the host discriminated by the discriminating means, and a control means that controls output so that outputs of data will be offset in accordance with the result of comparison made by the comparing means.

Still another object of the present invention is to provide an output method and unit in which a host intending to transmit output data is identified, it is checked whether the host is the one which transmitted output data during the previous output, and offsetting is performed during output in accordance with the result of the check.

BRIEF DESCRIPTION OF THE DRAWINGS

FIG. 8 is a block diagram showing a construction of a printer of a typical embodiment of the present invention;

FIG. 9 shows the details of a structure of a printer 10;

FIG. 10 shows correspondences between host IDs of host computers connected to a printer and types of emulation.

DESCRIPTION OF THE PREFERRED EMBODIMENTS

Embodiments relating to the present invention will be described in detail with reference to the appended drawings.

This embodiment will be described on the assumption that a laser beam printer based on an electrophotographic process using toner as a coloring material is employed as a printer.

Figure 6:
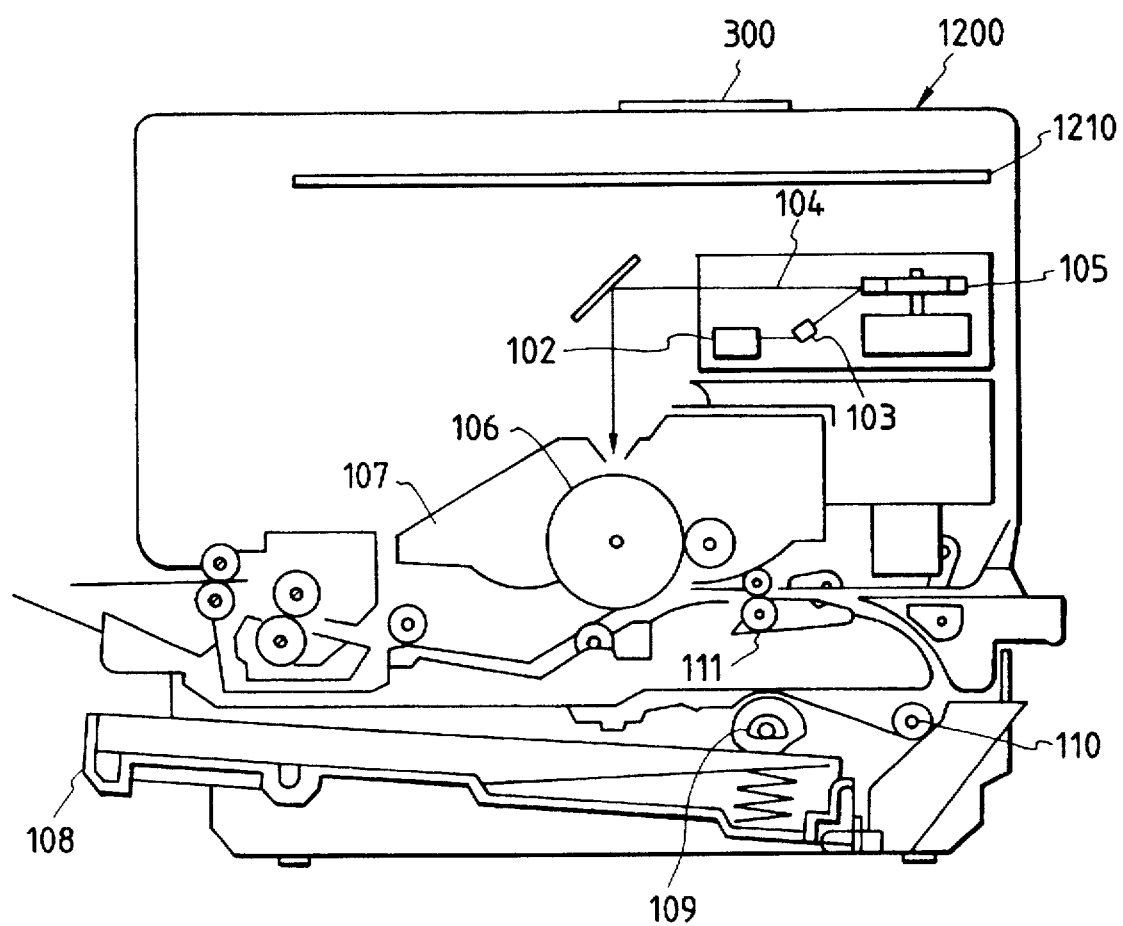
FIG. 6 shows a cross-sectional structure of a laser beam printer in an embodiment.

FIG. 6 is a cross-sectional diagram showing an internal structure of a laser beam printer (hereafter, LBP) of an embodiment. The LBP can receive character patterns and form data from data sources which are not shown, and register them.

In FIG. 6, 1200 denotes an LBP body. The LBP body inputs and stores print information (for example, character codes), and form information or macroinstructions, which are supplied from host computers connected externally, creates associated character patterns or form patterns in accordance with the information, and forms images on recording paper that is a recording medium. 300 denotes an operation panel on which switches and LED indicators are arranged for operations. 1210 denotes a controller that controls the LBP 100 as a whole, and analyzes character information supplied from host computers. The controller 1210 converts character information into a video signal representing character patterns associated with the character information, and outputs the video signal to a laser driver 102.

The laser driver 102 is a circuit for driving a semiconductor laser 103. In response to an input video signal, the laser driver 102 turns on or off a laser beam 104 emitted from the semiconductor laser 103. The laser beam 104 is swung right and left by a rotary polygon mirror 105 to scan an electrostatic drum 106. Thereby, the electrostatic drum 106 is exposed to light. Then, an electrostatic latent image consisting of character patterns is formed on the electrostatic drum 106. The latent image is developed by a developing unit 107 surrounding the electrostatic drum 106, then transferred to recording paper. Cut forms are employed as the recording paper. The cut forms of recording paper are accommodated in a paper cassette loaded in the LBP 100, fetched into the printer by means of a paper feed roller 109 and transport rollers 110 and 111, then supplied to the electrostatic drum 106.

Figure 1:
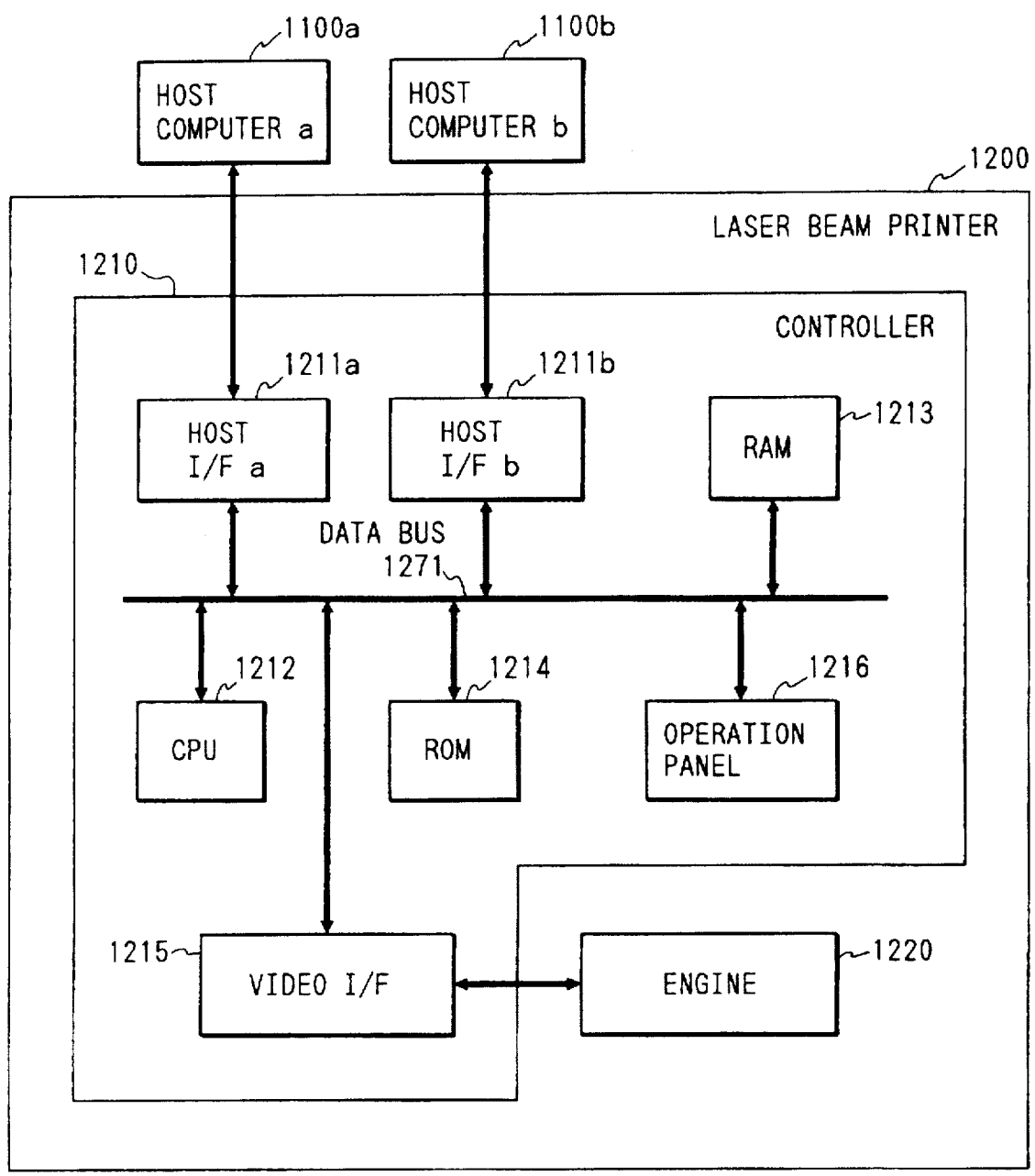
FIG. 1 is a block construction diagram of a printer according to the present invention.

FIG. 1 is a block construction diagram of a printer, which is an LBP, of an embodiment. The printer comprises host computers 1100a and 1100b, and a printer body 1200. In this embodiment, two host computers 1100a and 1100b are connected.

Host computers 1100a and 1100b send print data and control instructions for a printer body 1200 to the printer body 1200, and instructs the printer body 1200 to perform printing. The printer body 1200, as described previously, is divided into a controller 1210 and an engine 1220.

The controller 1210 receives print data and control instructions from the host computer 1100a or 1100b, creates bit map information according to the received data and instructions, then transfers the information as a video signal to the engine 1220. The engine 1220 receives the video signal from the controller 1210, and forms a visible image of the signal, on paper. The controller 1210 communicates with the engine 1220, whereby the controller 1210 reports the state of the engine 1220 externally and controls the engine 1220 as a whole.

The controller 1210 will be described in more detail.

The controller 1210 comprises host interfaces 1211a and 1211b, a CPU 1212, a RAM 1213, a ROM 1214, a video interface 1215, an operation panel 1216, and a data bus 1217. The host interfaces 1211a and 1211b transfer data to or from the host computers 1100a and 1100b. In this embodiment, two host interfaces are installed. The CPU 1212 controls the printer as a whole, analyzes print data, and creates bit map information. The RAM 1213 is used to interpolate data sent from the host computers 1100a and 1100b, bit map information, or various registered data, and to temporarily store information when serving as a work area for information processing. The ROM 1214 contains programs for controlling the printer, which will be described later, and font information. The video interface 1215 transfers data to or from the engine 1220. The operation panel 1216 sets, modifies, or displays parameters for specifying print environments. Data transferred within the controller 1210 flows over the data bus 1217. Arrows in FIG. 1 indicates data flows.

Next, operation procedures of the CPU 1212 in the controller 1210 will be described in conjunction with FIGS. 2 to 5. Programs relating to the flowcharts reside in the ROM 1214.

Figure 2:
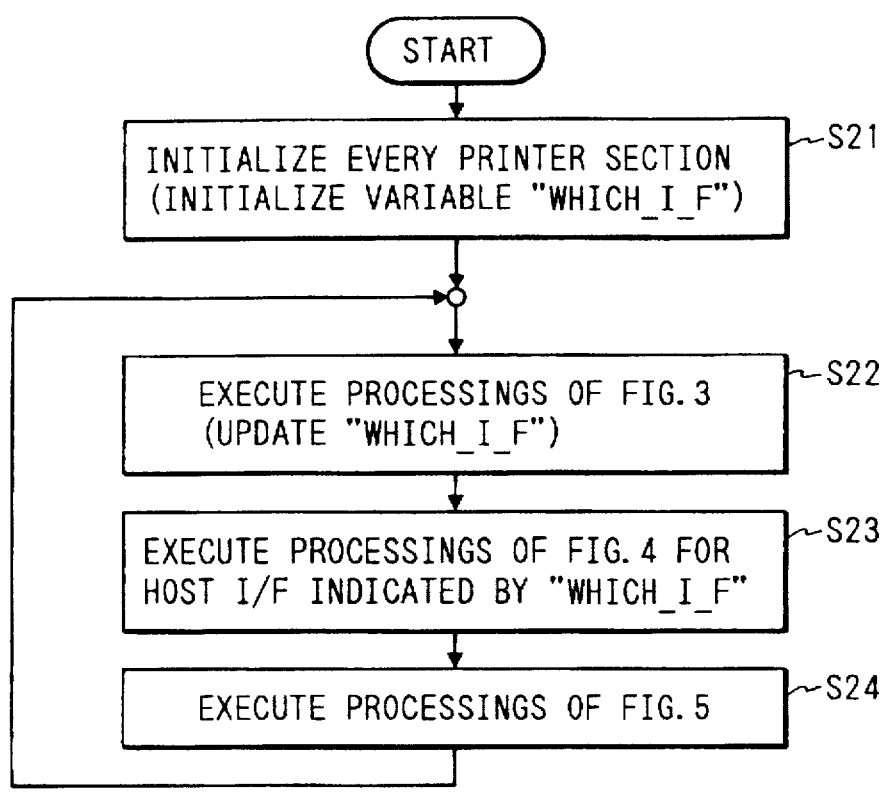
FIG. 2 is a flowchart showing main processing in the first embodiment.
Figure 3:
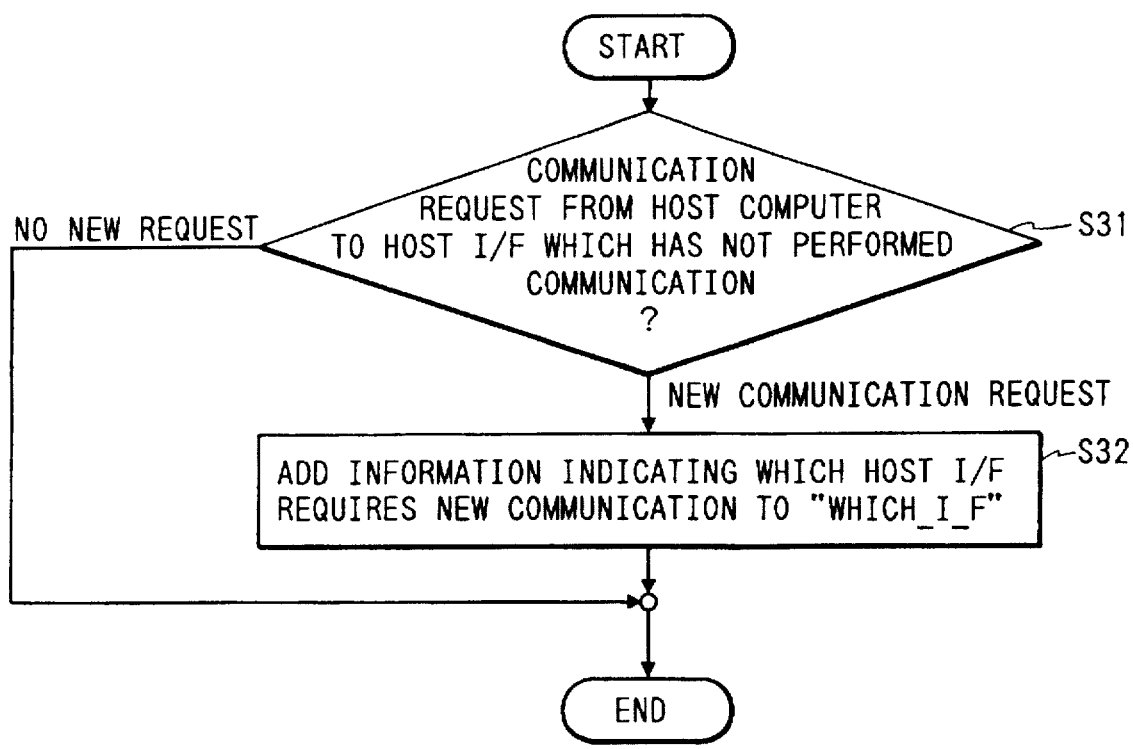
FIG. 3 is a flowchart showing communication request check processing in the first embodiment.
Figure 4:
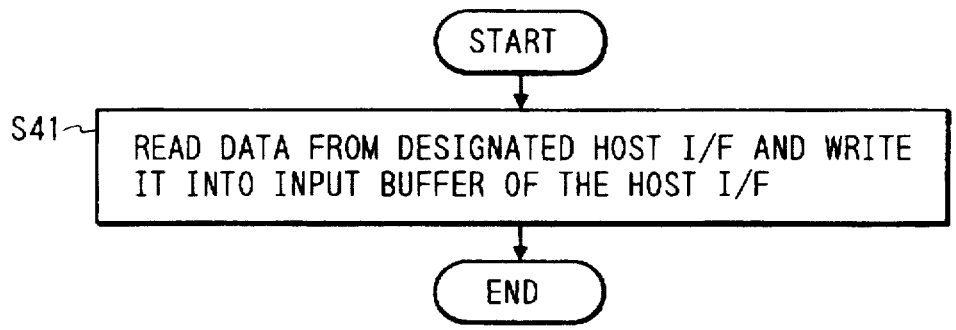
FIG. 4 is a flowchart showing processing related to data entry in the first embodiment.
Figure 5:
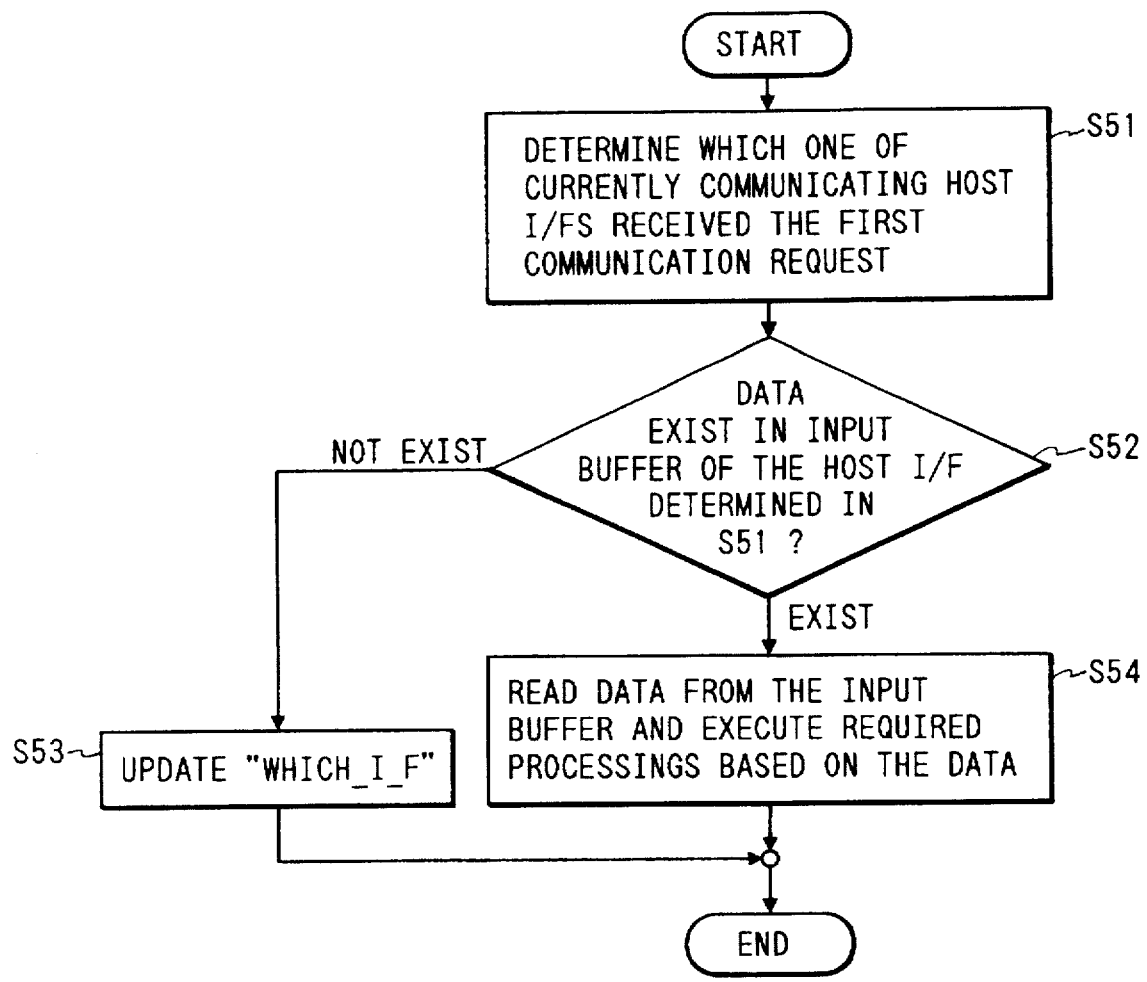
FIG. 5 is a flowchart showing printing in the first embodiment.

FIG. 2 shows the processing for controlling a printer as a whole. The processing of FIG. 2 calls the processing of FIGS. 3, 4, and 5 sequentially. The flowchart of FIG. 3 shows the processing for checking if a new communication request is issued for a host interface for which no data was sent when the processing was executed previously. FIG. 4 shows the processing for reading data from a designated host interface and writing the data in an input buffer for the interface. FIG. 5 shows the processing for reading data from the input buffer and printing the read data. The subsequent description will be made on the assumption that a variable "which_i_f" is reserved in the RAM 1213.

A specific example of processing will be described. For simple explanation, data is sent from the host computer 1100a, printing is performed on the data, and data is sent from the host computer 1100b during the printing.

When the power supply of the printer is turned on, first, the components of the printer are initialized at a step S21. The initialization of the step S21 includes initialization of, for example, a variable "which_i_f" reserved in the RAM 1213. The variable "which_i_f" contains the information which host interface is currently engaged in communication and in what order communication requests are issued.

At the next step S22, the processing shown in FIG. 3 is called.

When the processing is called, at a step S31, the information recorded in the variable "which_i_f" is checked to see if a communication request is issued from a host computer for a host interface which did not communicate with the printer previously. If a new communication request is not issued, the processing terminates. If a new communication request is issued, the processing passes to a step S32. In this embodiment, first of all, data is sent from the host computer 1100a. Therefore, the processing passes to the step S32.

At the step S32, the information via which host interface communication must be done is appended to the variable "which_i_f". Then, the processing terminates. In this embodiment, the information that the host interface 1211a is the host interface via which communication must be done is appended to the variable "which_i_f". Needless to say, when the host interface 1211b is the host interface via which communication must be done, data indicating the fact is appended. When the processing of FIG. 3 terminates, the main processing of FIG. 2 passes to a step S23.

At the step S23 in FIG. 2, based on the information recorded in the variable "which_i_f", the processing of FIG. 4 is started for a host interface via which communication must be done. In short, the processing of FIG. 4 is called.

At a step S41 in FIG. 4, data is read via the designated host interface, and the data is written in an input buffer (reserved in the RAM 1213) associated with the host interface. Then, the processing of FIG. 4 terminates. In this embodiment, data is read via the host interface 1211a. In this embodiment, even if data is sent sequentially via the host interface 1211a, after data is read for a certain period of time or a certain amount of data is read, communication is suspended to terminate the processing of FIG. 4. Owing to this control procedure, a consecutive data flow can be read by receiving inputs via multiple host interfaces alternately. When the processing of FIG. 4 terminates as mentioned above, processing passes to a step S24 in FIG. 2.

At the step S24 in FIG. 2, the processing of FIG. 5 is called.

At a step S51 in FIG. 5, the information recorded in the variable "which_i_f" is checked to see for which one of host interfaces currently engaged in communication a communication request is issued first. Then, the processing passes to a step S52. In this embodiment, the host interface 1211a is the host interface for which a communication request is issued first.

At the step S52, it is checked if data resides in the input buffer for the host interface that was recognized at the step S51 as a host interface for which a communication request is issued first. If no data resides, the processing passes to a step S53. If data resides, the processing passes to a step S54.

At the step S54, data is read from the input buffer for the host interface selected at the step S52. The data is analyzed to perform necessary processing. Then, the processing of FIG. 5 is terminated. What is referred to as necessary processing is that data sent from the host computer is used to develop bit map information or that bit map information is printed on paper.

On the other hand, at the step S53, on the assumption that communication via the host interface, which was recognized at the step S52 as a host interface for which a communication request had been issued first, has terminated, the recorded contents of the variable "which_i_f" are updated. Then, the processing of FIG. 5 is terminated. To be more specific, during the update, the name of the host interface selected at the step S52 is deleted from the list of host interfaces currently engaged in communication, and the information of the remaining host interfaces whose orders in which communication requests were issued are incremented by one is recorded in the variable "which_i_f".

When the processing of FIG. 5 terminates as described above, processing returns to the step S22 in FIG. 2.

When the processing from the step S22 to S24 in FIG. 2 is repeated, data are read from the host computers repeatedly, and the data are printed continuously. In this embodiment, at this stage of the description, data have been read from the host computer 1100a via the host interface 1211a. Thereafter, it will be described what kind of processing will be executed when a communication request is issued by the host computer b 1100b during the aforesaid communication with the host computer a 1100a.

Within a sequence of operations from the steps S22 to S24, the printer is communicating with the host computer 1100a and the communicated data are being processed. In this sequence, if the host computer 1100b issues a communication request, it is detected at a step S31 in FIG. 3 that a new communication request-has been issued. At a step S32, the recorded contents of the variable "which_i_f" are updated. Specifically, such information that the host interface 1211b also gets engaged in communication is appended to the variable "which_i_f" recording the information that only the host interface 1211a is engaged in communication at this stage.

Next, data is read from the host computer 1100a via the host interface 1211a at the step S23 in FIG. 2. Then, data is read from the host computer 1100b via the host interface 1211b.

Then, the processing from the step S22 to S24 in FIG. 2 is repeated. Thereby, while data concerning the usage of the data from the host computer 1100a and of the data from the host computer 1100b is being read, printing based on the data sent from the host computer 1100a can be continued.

When all the data from the host computer 1100a have been processed, the input buffer for the host interface 1211a becomes empty. Thereby, processing passes from a step S52 to a step S53 in FIG. 5. The information concerning the host interface 1211a is deleted from the recorded contents of the variable "which_i_f". Thereafter, the host computer 1100b is recognized as a host computer that had issued the first communication request. Then, printing is continued using data read from the host computer 1100b.

As described above, even when one of two host interfaces is used to communicate with a host computer, a host interface, which is not used for communication, can function on receipt of data. Owing to this control method, even when one of two host interfaces is used to communicate with a host computer, data can be sent from a host computer connected to the other host interface. After printing based on data sent from a host computer that started communication earlier is completed, printing based on data sent from the other host computer can be started.

[Description of the Second Embodiment]

In the aforesaid first embodiment, two host interfaces are installed. The present invention can apply to the same processing to be performed when three host interfaces are installed.

[Description of the Third Embodiment]

In the aforesaid first and second embodiments, print data sent from multiple host computers can be received. Needless to say, what is actually printed is a series of print data sent from a single host computer. Printing of data received from other host computers is not carried out until the previous printing is completed. Therefore, it is uncertain whether the printer has received the data sent from other host computers. In the third embodiment, it is notified externally from which host computer data is being received.

Figure 7:
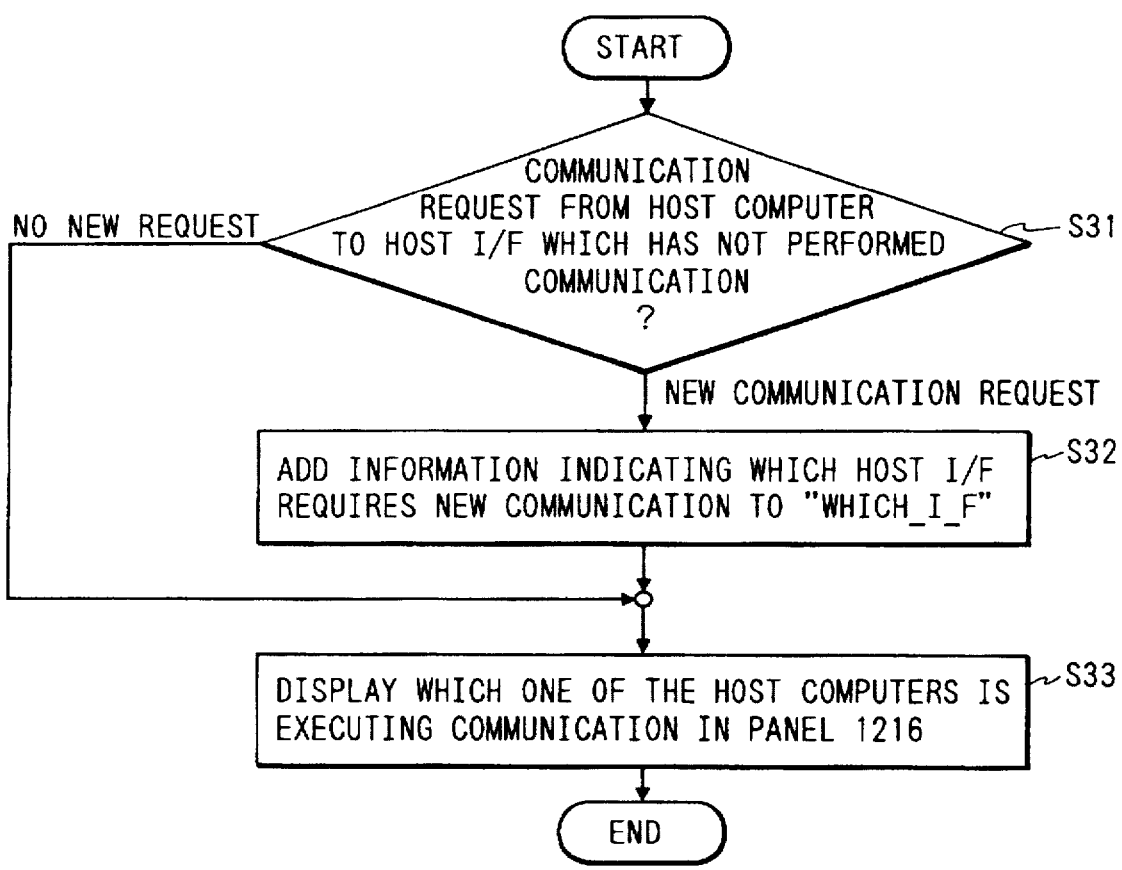
FIG. 7 is a flowchart showing communication request check processing in the third embodiment.

To realize the notification, the previous routine shown in FIG. 3 is replaced with the one shown in FIG. 7 in the third embodiment.

Steps S31 and S32 in FIG. 7 are identical to the corresponding ones in FIG. 3. Only a step S33 in FIG. 7 will be described.

When processing has passed to the step S33, the data indicating which host computers are currently communicating with the printer is specified in the variable "which_i_f". Therefore, at the step S33, the information corresponding to the data specified in the variable "which_i_f" is displayed on an operation panel 1216. For example, LEDs are installed on the operation panel 1216 by the number of host computers connectable to the printer. Then, an LED associated with a host computer that is communicating with the printer is lit. As described in the first embodiment, however, for a printer in which only two host computers can be connected, only one LED is required. Alternatively, when the operation panel 1216 has a liquid crystal display (hereafter, LCD), a message or symbol indicating a host computer currently communicating with the printer may be displayed.

Furthermore, not only which host computer is currently communicating with the printer but also from which host computer print data being printed originate may be notified. In this case, LEDs may be installed in association with host computers, or a message or symbol may be displayed on an LCD.

In the first to third embodiments, no comment is made on a type of host interface. This is because the present invention can apply to any type of host interface.

In the previous embodiments, an electrophotographic printing type engine is employed as an engine for a printer. The present invention can apply to any printer having any type of engine; such as, an engine of a thermal recording type, an ink jet recording type, or a wire dot recording type.

In the embodiments, data received from host computers are stored in buffers, which are reserved in an RAM 1213, in one-to-one correspondence with the host computers. A hard disk or other external memory may be installed so that the data can be stored in the external memory.

Moreover, in the embodiments, while printing is under way, it is determined whether a transmission request is issued for any other host interface. Every time data is received via an interface, an interrupt signal may be fed to a CPU 1212. In response to each interrupt signal, the CPU 1212 may execute an interrupt routine to update the variable "which_i_f".

As described so far, according to the present invention, print data can be received from multiple data generation sources. Therefore, even when printing is executed for a specific data generation source, other data generation sources need not delay outputting their print data.

With which data generation source the printer is communicating is notified externally. Therefore, the users of respective data generation sources can confirm that the user-specified printing is being carried out.

[Offset Stacking]

Other preferred embodiments of the present invention will be described with reference to the appended drawings.

[Outline of the Printer (FIG. 8)]

FIG. 8 is a block diagram showing a construction of a printer representing a typical embodiment of the present invention. In FIG. 8, 1a to 1n denote hosts for transferring data. 2 denotes an SCSI interface. 3 denotes an input buffer that stores input data temporarily. 4 denotes a CPU that controls the printer as a whole. 5 denotes a ROM containing control programs and various processing programs. 6 denotes a RAM used to store various information necessary for printing or used as a work area of each program. 7 denotes a pattern memory containing character patterns in association with character codes. 8 denotes an image memory that stores images for one page. 9 denotes a printer interface that extends control throughout a printer, for example, transfers image data existent in the image memory to a printer. 10 denotes a printer that actually performs printing.

The CPU 4 analyzes data read from the input buffer 3, and develops images of print data in the image memory 8 while referencing character patterns existent in the pattern memory 7.

[Detailed Description of a Construction of a Printer 10 (FIG. 9)]

FIG. 9 shows an internal structure of a printer 10 (hereafter, LBP) capable of registering character patterns received from a data source (not shown) or form data, and outputting image data provided via the printer interface 9 on recording paper. In FIG. 9, 100 denotes an LBP body, wherein character information (character codes), and form information or macroinstructions, which are supplied by hosts 1a to 1n, are input and stored, associated character and form patterns are created in accordance with the information, and images are formed on recording paper that is a recording medium. 101 denotes an operation panel on which switches and LEDs, which are designed for operation, and an LCD are arranged. 1000 denotes a print controller that controls the LBP 100 as a whole and analyzes character information supplied by external units. The print controller 1000 converts character information into a video signal representing character patterns associated with the character information, and outputs the video signal to a laser driver 102.

The print controller 1000 accommodates, as shown in FIG. 8, an SCSI interface 2, an input buffer 3, a CPU 4, a ROM 5, a RAM 6, a character pattern memory 7, an image memory 8, and a printer interface 9.

The laser driver 102 is a circuit for driving a semiconductor laser 103. In response to an input video signal, the laser driver 102 turns on or off a laser beam 104 emitted from the semiconductor laser 103. The laser beam 104 is deflected laterally by a rotary polygon mirror 105 to scan an electrostatic drum 106. Thereby, an electrostatic latent image consisting of character patterns is formed on the electrostatic drum 106. The latent image is developed by a developing unit 107 surrounding the electrostatic drum 106, then transferred onto recording paper. Cut forms are employed as the recording paper. The cut forms of recording paper are accommodated in a paper cassette loaded in the LBP 100, taken into the printer by means of a paper feed roller 109 and transport rollers 110 and 111, then fed to the electrostatic drum 106.

[Description of Printer Operations (FIGS. 10 and 11)]

FIG. 10 shows correspondences between hosts connected to a printer of this embodiment and types of emulation. This information is stored in a RAM 6. In FIG. 10, 201 denotes an ID number of a host (hereafter, host ID). 202 denotes a compatible type of emulation. 203 indicates that a host ID is 7. For the host having a host ID 7, an emulation program (emulation 1) specified in 204 is executed to analyze data. Similarly, for a host having a host ID 6, an emulation program (emulation 2) specified in 206 is executed to analyze instructions and to process data.

Figure 11:
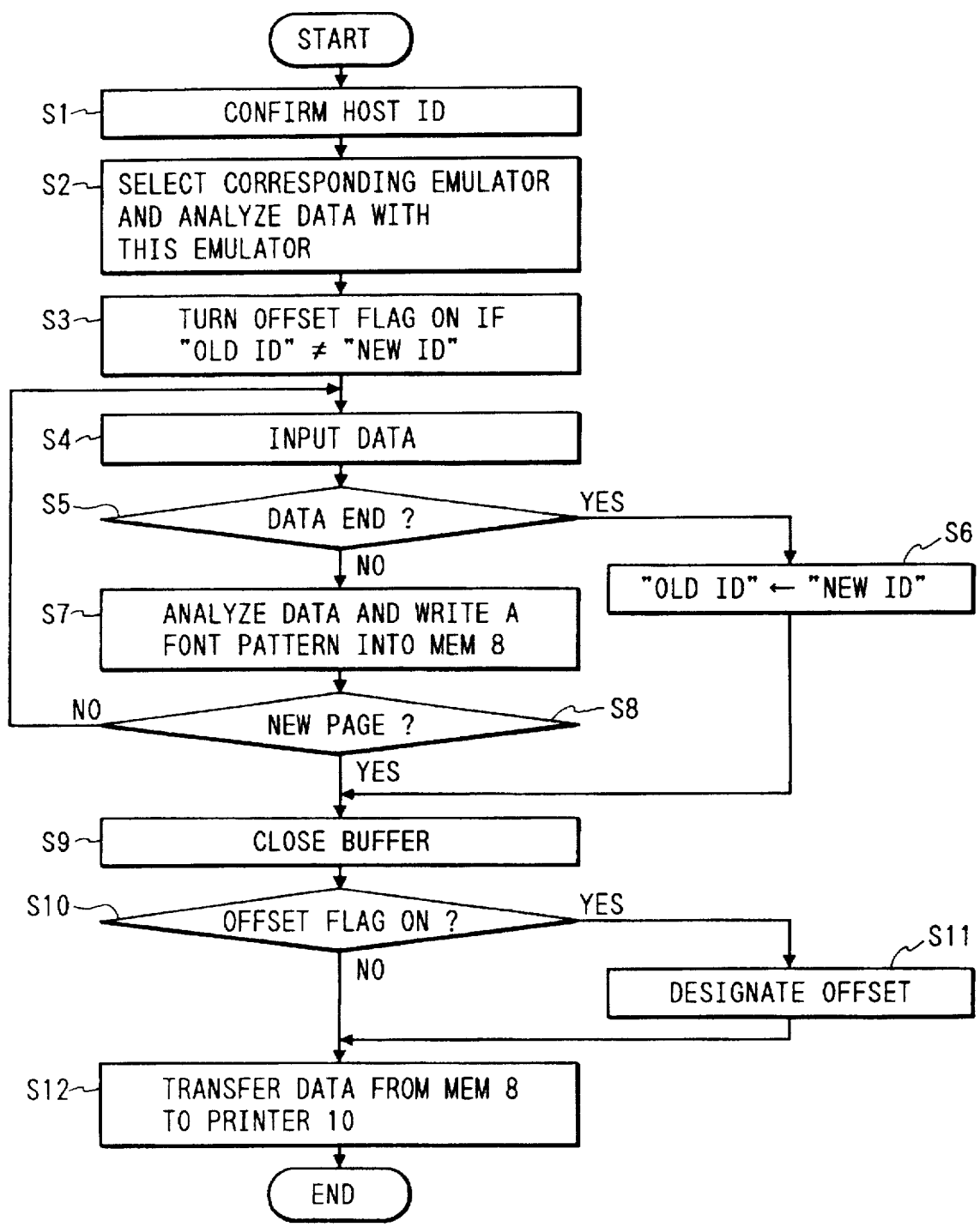
FIG. 11 is a flowchart showing a procedure in which hosts serving as suppliers of print data are discriminated and printout is performed.

Operations executed by a printer having the foregoing construction will be described with reference to the flowchart of FIG. 11. Herein, any of the hosts 1a to 1n transmits data, and the printer of this embodiment starts printing. When communicating with the printer, before transferring data, the hosts informs the printer of their host IDs.

In the above printing, a host ID sent from a host is identified. Every time hosts transmitting print data are changed, an offset flag residing in the RAM 6 is turned on or off. Based on the value of the offset flag, it is controlled whether or not to offset an output of the printer.

First, at a step S1, a host ID of a host that has called the printer is checked. At a step S2, the information of correspondences between connected hosts and emulation types, which is stored in the RAM 6, is referenced to select an emulation prodram (hereafter, emulator) associated with the same ID as the host ID checked at the step S1. The selected emulator is executed to analyze input data. At the step S3, a host ID (old ID) of a host, which happened to be a data supplier for the previous printing, is compared with the host ID (new ID) of the host, which has called the printer at the step S1. When the old and new host IDs are different from each other (hosts supplying print data are changed), the offset flag is turned on. Then, data is fetched from the input buffer 3 at a step S4.

At a step S5, it is checked if the host has completed data transmission. If it is determined that data has come to an end, processing passes to a step S6. Then, the new ID is set as an old ID. By contrast, when it is determined that data transmission has not terminated, processing passes to a step S7.

The CPU analyses transmitted data. If the data is a control code, an instruction is analyzed. If the data is a character code, a font pattern associated with the character code is read from the pattern memory 7 and written in the image memory 8. Next, at a step S8, an amount of output data supplied to the image memory 8 is checked to see if form feed is required. If it is determined that form feed is required, processing passes to a step S9. Then, the input buffer 3 is closed. On the contrary, if form feed is not required, processing returns to the step S4. Then, data entry is repeated.

At a step S10, the offset flag is checked. If the offset flag value is on, processing passes to a step S11. Then, offset is specified in the printer 10 via the printer interface 9. By contrast, if the offset flag value is off, processing passes to a step S12. Then, data developed in the image memory 8 is transferred to the printer 10 via the printer interface 9, and printed. At this time, if the offset flag value is off, outputs of the printer are not offset. If the offset flag value is on, outputs are offset by a specified amount.

As described above, according to the present embodiment, every time hosts serving as suppliers of print data are changed, whether or not print outputs are offset is switched, then printout is carried out. Therefore, printouts can be easily-sorted by hosts.

In this embodiment, when data is transmitted from multiple host computers, offset stacking is carried out. The present invention is not limited to this mode. For example, offset stacking may be performed depending on the type of emulation. When a host ID or equivalent is not assigned, standard emulation may be pre-programmed. Alternatively, hosts may be discriminated by outputting partition paper at every start of printout of data from a different host.

The present invention may apply to a printing system made up of multiple equipment or a printer formed with a single equipment. The present invention can, needless to say, apply to a printing system or a printer in which programs are implemented.

As described so far, according to the present invention, a host transmitting print data is identified, and checked if the host is identical to the one that transmitted print data during the previous printing. Then, based on the result of the comparison, print outputs are offset. Every time hosts transmitting print data are changed, offsetting is performed alternately. Consequently, printouts can be easily sorted by hosts.

What is claimed is:

1. An output apparatus for processing data input selectively from a plurality of host computers and for outputting a data processing state, said output apparatus comprising:

input means for inputting data selectively from the plurality of host computers;

discriminating means for, when input data is supplied from one of the plurality of host computers in the absence of a command from said output apparatus to the one host computer to initiate data input to said output apparatus, discriminating from which one of the plurality of host computers the input data is supplied; and informing means for informing an operator of said output apparatus of a data processing state of said output apparatus in response to a discrimination by said discriminating means.

2. An output apparatus according to claim 1, wherein said input means comprises a plurality of host interfaces.

3. An output apparatus according to claim 1, wherein said input means selectively inputs data from the plurality of host computers and the input data are stored in a memory distinguishably from each other.

4. An output apparatus according to claim 1, wherein said discriminating means discriminates the one host computer from the rest of the host computers based on discrimination data included in the input data.

5. An output apparatus according to claim 1, further comprising output means for generating output data based on the data input selectively from the plurality of host computers.

6. An output method carried out in an output apparatus for processing data input selectively from a plurality of host computers and for outputting a data processing state, said output method comprising the steps of:

inputting data selectively from the plurality of host computers;

discriminating, when input data is supplied from one of the plurality of host computers in the absence of a command from the output apparatus to the one host computer to initiate data input to the output apparatus, from which one of the plurality of host computers the input data is supplied; and informing an operator of the output apparatus of a data processing state of the output apparatus in response to a discrimination made in said discriminating step.

7. An output method according to claim 6, wherein said inputting step inputs the data selectively via a plurality of host interfaces.

8. An output method according to claim 6, wherein the input data are stored in a memory distinguishably from each other.

9. An output method according to claim 6, wherein said discriminating step discriminates the one host computer from the rest of the host computers based on discrimination data included in the input data.

10. An output method according to claim 6, further comprising the step of generating output data based on the data input selectively from the plurality of host computers.

11. A memory medium for storing a program used in a programmable output apparatus such that, when the memory medium is loaded into the output apparatus, the output apparatus is programmed to perform a method for processing data input selectively from a plurality of host computers and for outputting a data processing state, the method comprising the steps of:

inputting data selectively from the plurality of host computers;

discriminating, when input data is supplied from one of the plurality of host computers in the absence of a command from the output apparatus to the one host computer to initiate data input to the output apparatus, from which one of the plurality of host computers the input data is supplied; and informing an operator of the output apparatus of a data processing state of the output apparatus in response to a discrimination made in said discriminating process.

12. A memory medium according to claim 11, wherein said inputting step inputs the data selectively via a plurality of host interfaces.

13. A memory medium according to claim 11, wherein the input data are stored in a memory distinguishably from each other.

14. A memory medium according to claim 11, wherein said discriminating step discriminates the one host computer from the rest of the host computers based on discrimination data included in the input data.

15. A memory medium according to claim 11, wherein the method further comprises the step of generating output data based on the data input selectively from the plurality of host computers.

16. An output apparatus for processing data input selectively from a plurality of host computers and for outputting a data processing state, said output apparatus comprising:

a host interface for inputting data selectively from the plurality of host computers;

a controller for, when input data is supplied from one of the plurality of host computers in the absence of a command from said output apparatus to the one host computer to initiate data input to said output apparatus, discriminating from which one of the plurality of host computers the input data is supplied and informing an operator of said output apparatus of a data processing state of said output apparatus in response to a discrimination by said controller.

17. An output apparatus according to claim 16, further comprising a plurality of said host interfaces.

18. An output apparatus according to claim 16, wherein said host interface selectively inputs data from the plurality of host computers and the input data are stored in a memory distinguishably from each other.

19. An output apparatus according to claim 16, wherein said controller discriminates the one host computer from the rest of the host computers based on discrimination data included in the input data.

20. An output apparatus according to claim 16, further comprising an output device for generating output data based on the data input selectively from the plurality of host computers.

* * * * *

UNITED STATES PATENT AND TRADEMARK OFFICE
CERTIFICATE OF CORRECTION

PATENT NO. : 5,727,134
DATED : March 10, 1998
INVENTOR(S) : Yuichi Higuchi, et al.

It is certified that error appears in the above-identified patent and that said Letters Patent is hereby corrected as shown below:

<u>COLUMN 8</u>

Line 12, " "which_i_f'." should read --"which_i_f".--.

<u>COLUMN 9</u>

Line 45, "ls" should read --is--; and
Line 52, "prodram" should read --program--.

Signed and Sealed this

First Day of September, 1998

Attest:

BRUCE LEHMAN

*Attesting Officer*    *Commissioner of Patents and Trademarks*